July 29, 1969     A. J GASBARRA     3,458,079
SEALING ARRANGEMENT FOR PLASTIC CONTAINER
Filed Aug. 14, 1967     2 Sheets-Sheet 2
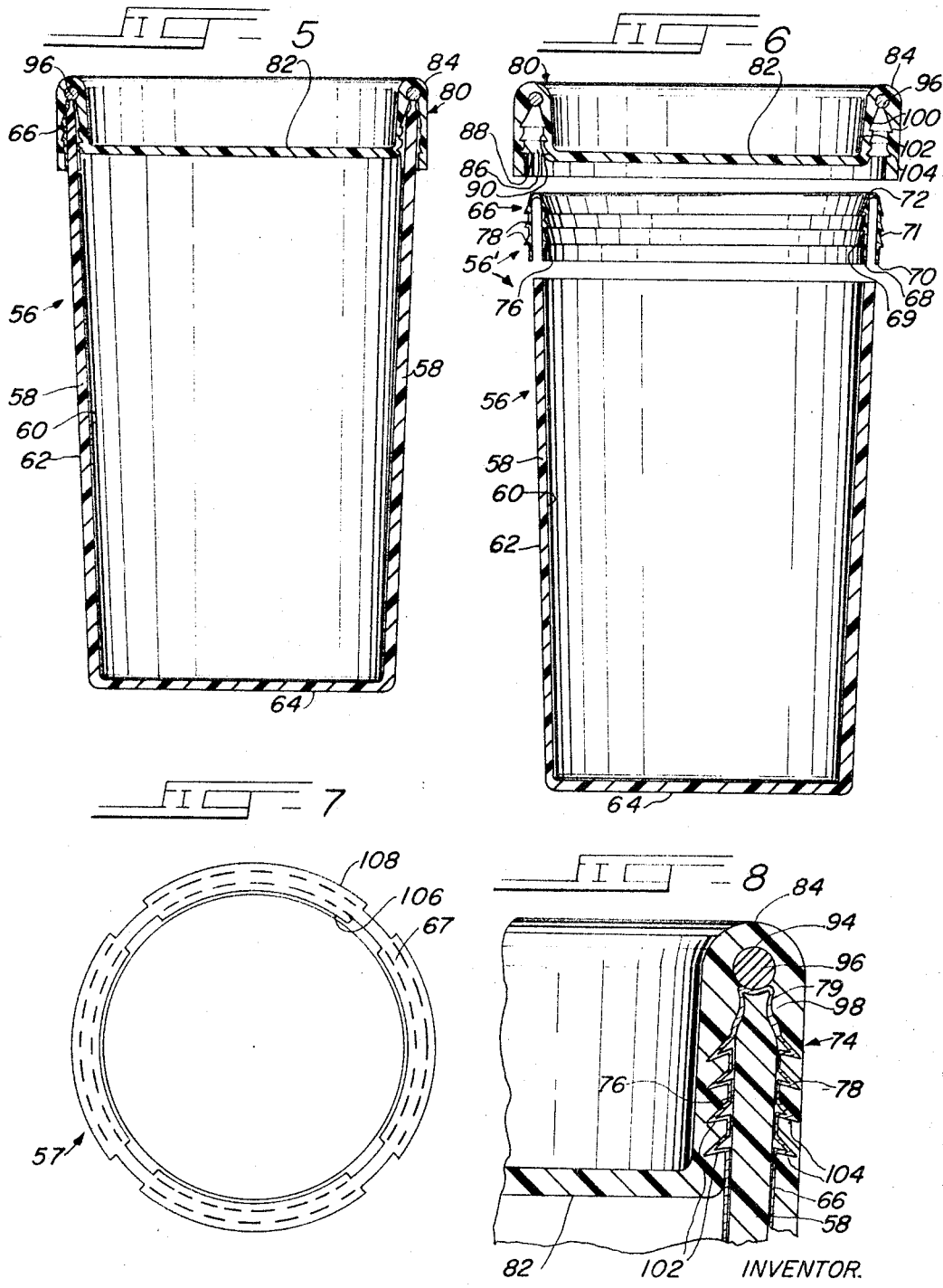
INVENTOR.
ANTHONY J. GASBARRA United States Patent Office 3,458,079
Patented July 29, 1969

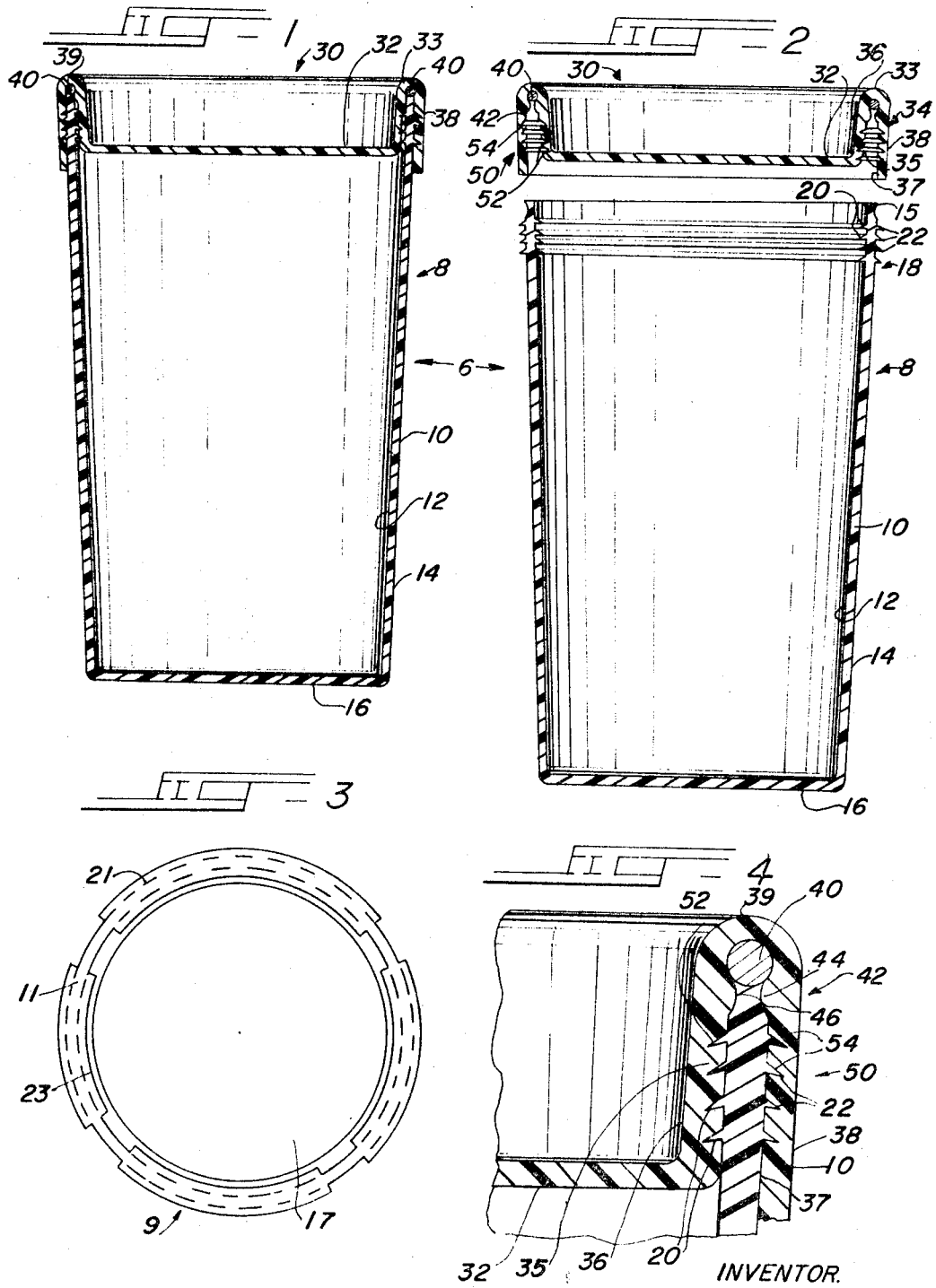

3,458,079
SEALING ARRANGEMENT FOR
PLASTIC CONTAINER
Anthony J. Gasbarra, Flossmoor, Ill., assignor to Bennett Industries, Inc., Peotone, Ill., a corporation of Delaware
Filed Aug. 14, 1967, Ser. No. 660,375
Int. Cl. B65d 43/00, 39/00, 41/00, 45/00
U.S. Cl. 220—24                                    15 Claims

ABSTRACT OF THE DISCLOSURE

An improved container may be constructed by providing barbs located on both the inner and outer surfaces of a container body side wall adjacent the open end thereof, and closure means including grooves placed in the opposed sides of an inverted channel located at the periphery thereof. Alternatively, the barbs may be located on the inner and outer surfaces of a rigid, U-shaped sleeve positioned over the rim of the container body side wall. In order to provide a fluid-tight seal between the container body and closure member, an annular seal may be arranged at the vertex of the channel sides and held in place by beads located in the channel sides adjacent the seal. When the closure member is mated with the container body, the rim of the container body depresses the seal, and the barbs located on the inner and outer surfaces of the container body mate in positive locking engagement with the grooves in the sides of the channel to form a fluid-tight seal.

BACKGROUND OF THE INVENTION

Field of the invention

This invention generally relates to plastic container sealing arrangements, and more particularly concerns a sealing arrangement for plastic drums, pails, and similar containers.

Description of the prior art

The prior art contains numerous examples of attempts to design closure apparatus which can be adapted for use with plastic drums and pails. This proliferation of design in the field of plastic containers has, in large measure, resulted from the obvious advantages of plastic over conventional materials such as steel. A plastic container suitable for shipping and storage would be more economical than a similarly sized metal container by reason of the comparatively higher cost of conventionally utilized materials in relation to plastics (such as polyethylene). Moreover, problems of corrosion, which often arise with metal containers, could be avoided since plastics are generally more resistant than metals to corrosion and other similar forms of attack. Additionally, the effective substitution of plastic for metal in a commercial shipping container results in significant economies with respect to the weight of the container. However, despite these advantages, full utilization of plastic for commercial shipping and storage containers has not been realized because of difficulties involved in providing acceptable sealing arrangements for use with a plastic container body.

Previous container designs have not resulted in a sealing arrangement which is both reusable and, at the same time, able to maintain a fluid-tight seal during the abuses of freight handling and shipping.

Prior art snap-on closure arrangements for plastic containers (which are preferred over screw-on caps for large capacity industrial containers) generally include bands located on the outer surface of the container body which mate with corresponding grooves located in the inner surface of a depending skirt connected to a closure member. Obviously, such a device is difficult to open except by tearing a portion of the skirt, and once a sufficient portion of the skirt is removed, the cover provides inadequate closure if the container is resealed. Such closure is obviously unlikely to withstand abuse during reshipping and storage.

The prior art also includes closure apparatus in which a plastic cap or cover is mated to a glass or metal container body. Such designs are generally not applicable to containers using plastic bodies which, of course, are susceptible to flexure and buckling not present in rigid containers.

There is a "reusable" sealing cap which is held to a bottle neck by flanges which meet with corresponding grooves in the bottle neck. In order to remove the cap, a tear strip is provided which can be removed by pulling a grip tab outwardly and around the sealing cap. However, upon reclosure, the cap is only held to the bottle top by a single flange and a sleeve which extends into the orifice of the bottle. Such a cap is obviously unsuited for use with large capacity industrial containers which must provide an effective means of resealing the container after initial opening. If this sealing cap were used with a plastic container body, the result enclosure would not be fluid tight since any depression of the container body due to abuse during shipment would disturb the seal between the closure member and the container body. There are a number of available closures which also exhibit substantially the same disadvantages.

Each of the foregoing closure apparatuses exhibits deficiencies in sealing and ease of opening and reclosure which prevent full utilization of plastic container bodies for storage and shipment of industrial products.

The preferred embodiments of the present invention eliminate the disadvantages of both the Fox and Whitman type of closure apparatus and represent a significant advance in closure techniques which provide a fluid-tight seal between a plastic-type container body and a plastic closure member during initial shipment and after reclosure. All this is achieved without the aid of sealing wires or screw-type closure apparatus generally required by the prior art in order to achieve equivalent sealing effectiveness.

SUMMARY OF THE INVENTION

The disadvantages of the prior art may be eliminated by following the techniques described by the preferred embodiment described herein. A closure apparatus made in accordance with the present invention results in a fluid-tight container with properties of convenience, trouble-free operation, and resealing properties heretofore unattained. Briefly, the container closure combination of the present invention comprises an open-end container body having a flexible side wall structure and a bottom wall structure at one end of the body, the other end of the body being open. Barb means are provided on both the outer and inner surfaces of the container body adjacent the open end thereof. Closure means for the container includes an inverted channel provided at the periphery thereof. The inverted channel has opposed downwardly extending sides arranged so that the closure means may be placed downwardly over the open end of the container body. The opposed inner faces of the channel sides are provided with grooves adapted for mating engagement with the barbs located on the container body, whereby a fluid-tight seal is effective between the closure member and container body. Preferably, resilient sealing means are provided at the base of the channel and are retained in position by retaining means in the channel.

Thus, a primary object of the present invention is to provide a sealing arrangement for an all plastic shipping container comprising a container body and a closure member which may easily be opened and closed on the job site without special tools, and which will provide an effective seal each time it is closed.

Another object of the present invention is to provide a sealing arrangement of the character described which may be easily and effectively closed after initial filling by conventional closing equipment.

Another object of the present invention is to provide a sealing arrangement of the character described in accordance with which a strong, light, fluid-tight seal is effected between the closure member and the sealing surface on the container body.

Yet another object of the present invention is to provide a sealing arrangement of the character described in accordance with which a simplified method of construction of different sizes and styles of containers may be achieved at low cost.

Still another object of the present invention is to provide a sealing arrangement whereby a container body is reinforced near the open end thereof.

DESCRIPTION OF THE DRAWINGS

The foregoing objects, advantages, and features of the subject invention will hereinafter appear, and, for purposes of illustration, but not of limitation, exemplary embodiments of the present invention are illustrated in the accompanying drawings, in which:

FIGURE 1 is a cross-sectional, side elevational view of a container body with a closure member attached thereto made in accordance with the present invention;

FIGURE 2 is a cross-sectional, side elevational view showing the container body and closure member of FIGURE 1 in a separated condition;

FIGURE 3 is a top view of a second embodiment of a container body made according to the present invention;

FIGURE 4 is an enlarged, cross-sectional view of the container body and closure member shown in FIGURE 1;

FIGURE 5 is a cross-sectional, side elevational view of a two-piece container body with a closure member attached thereto made in accordance with the present invention;

FIGURE 6 is a cross-sectional, side elevational view showing the container body and closure member of FIGURE 5 in a separated condition;

FIGURE 7 is a top view of a fourth embodiment of a container body made according to the present invention; and FIGURE 8 is an enlarged cross-sectional view of the two-piece container body and closure member shown in FIGURE 5.

DESCRIPTION OF THE PREFERRED EMBODIMENT

With reference to FIGURES 1–4, a composite container 6 comprising a container body 8 and a closure member 30 is shown. Container body 8 comprises a generally cylindrical side wall structure 10 including an inner surface 12, an outer surface 14, a top rim 15, and an integrally formed bottom wall structure 16.

Adjacent the open end of the container body is barb means 18 including a plurality of inner barbs 20 located on the inner surface of the side wall structure, and a plurality of outer barbs 22 located on the outer surface of the side wall structure.

Although barb means 20 and 22 are shown extending continuously around the side wall structure in the drawing, the advantages of the present invention may also be achieved by providing discontinuous barb means. FIGURE 3 illustrates a container body 9 having a side wall 11 and a bottom wall 17. Extending from the inner and outer surfaces of side wall 11 are inner barb members 23 and outer barb members 21, respectively. Both the inner and outer barb members are interrupted adjacent corresponding sections of side wall 11, although the discontinuous portions could also be placed in a staggered arrangement. It is, of course, also possible to fabricate the container body with discontinuous barb members on the outer surface of side wall 11 and continuous barb members on the inner surface thereof and vice versa.

Closure member 30 comprises a central depending disc portion 32 and an annular rim portion 33 which forms an inverted channel 34 surrounding the central disc portion. Channel 34 is formed by an inner side 36 and an outer side 38 joined by a base section 39 and has an inner surface 35 and an outer surface 37. In the preferred embodiment, the side 38 is slightly longer than the inner side 36. However, those skilled in the art will appreciate that the lengths of the skirts may be altered to conform to various design requirements. For example, the side 38 may be made substantially longer than side 36 in order to improve closure effectiveness and provide increased rigidity in the upper portion of the container body.

In order to facilitate opening of the closure apparatus, a tear strip may be provided in the side 38. A tear strip is normally not required when the side 38 is reasonably short, but may reduce the effort required to remove the closure member from the container body when the side 38 is substantially longer than the side 36. When a container made according to the present invention is fabricated from plastic, a tear strip may be formed by merely perforating or channeling the circumference of side 38 adjacent the lower edge of side 36 and attaching a tear tab to side 38 below the perforation or channel. Typical methods of manufacturing a tear strip suitable for use with the present invention are also shown in the patent to Bardell, Patent No. 3,376,996.

On the interior of channel 34 adjacent base section 39, a resilient sealer 40 is held in place by retaining means comprising a pair of opposed annular beads 44, 46 formed in the inner faces of sides 36, 38. Beads 44 and 46 may be integrally fabricated into channel 34 when the closure member is made or they may be created by mechanical deformation after fabrication is completed. While it is preferred to use an opposed pair of beads, a single bead on either of the inner faces serves as a satisfactory retaining means.

Located in the opposed inner faces of sides 36, 38 of channel 34 are groove means 50 comprising inner grooves 42 and outer grooves 44 located in side 36 and side 38, respectively. As best seen in FIGURE 4, groove means 50 are adapted to mate in interlocking relationship with barb means 18 when closure member 30 is extended downward over the rim of container body 8. When closure has been achieved, the barb and groove means are interlocked and top rim 15 is in sealing relationship with sealer 40.

A closure member designed for use with a container body such as the one shown in FIGURE 3 may be made with continuous grooves or discontinuous grooves which are interrupted in areas corresponding to the sections of barbs in the container body which are discontinued. Surprisingly, a closure member and container body having barb and groove members which are not discontinuous in corresponding areas have proven to be as effective as matching barb and groove configurations in providing a fluid-tight seal.

Another embodiment of a composite container made according to the present invention is shown in FIGURES 5, 6, and 8, and comprises a container body 56 and a closure member 80. The container body 56 includes a side wall structure 56' which comprises a cylindrical main wall structure 58 having an inner surface 60 and an outer surface 62 and a U-shaped sleeve 66 having an inner surface 69 and an outer surface 71. A bottom wall structure is integrally formed with main wall structure 58.

The U-shaped sleeve 66, which takes the form of a second annular inverted channel, has an inner side 68 and an outer side 70 joined at the top portion thereof by a vertex portion 72. The sleeve further comprises barb members 74 including inner barb members 76 and outer barb members 78 and is preferably made from a rigid plastic which mill reinforce the open end of the container body side wall structure when the sleeve is co-mated therewith. However, if materials which have no corrosive properties are transported in the container, the sleeve may be made of metal or other appropriate materials well known to those skilled in the art.

Closure member 80 comprises a central disc portion 82 and an inverted channel 84 having a vertex 94. As best seen in FIGURE 6, channel 84 has an inner side 88 and an outer side 90. The opposed inner surfaces of the sides 88, 90 have groove means 100 including grooves 102 located on the side 88 and grooves 104 located on the side 90. A resilient sealer 96 is located adjacent the vertex 94 of channel 84 and is held in place by retaining means 98 (FIGURE 8). As best seen in FIGURE 8, similar retaining means 79 is located in sleeve 66 in order to securely attach the sleeve to the cylindrical side wall structure.

In order to assemble the two-piece container side wall structure, the sleeve 66 is urged downwardly over the top of main wall structure 58 until vertex 72 meets the top portion of the side wall, and retaining means 79 (FIGURE 8) securely fastens it in place. After the foregoing procedure has been followed, the container body is ready for use in connection with closure member 80 as described hereinafter. Of course, all of the modifications available for use in connection with closure member 30 described in connection with FIGURES 1, 2, and 4 (e.g., a tear strip) are also available for use with closure member 80.

FIGURE 7 illustrates another embodiment of the present invention in which the barb means are discontinuous. More specifically, FIGURE 7 illustrates a container body 57 having a sleeve 67 in which inner barb members 106 and outer barb members 108 are interrupted adjacent corresponding sections of the sleeve, although the discontinuous portions could also be placed in a staggered arrangement. It is, of course, also possible to fabricate the sleeve with discontinuous barb members on the outer surface thereof and continuous barb members on the inner surface thereof and vice versa. A closure member made for use with a sleeve having discontinuous barbs may be provided with grooves which are discontinuous at positions corresponding to the discontinuity in the barbs, or may be made as illustrated in FIGURES 5, 6, and 8. In either case, the closure member will result in a fluid-tight seal when co-mated with the two-piece container body.

A container body and closure member used with the present invention are preferably formed from a suitable semi-rigid plastic having strength sufficient to withstand the abuses to which a shipping container is subjected in normal use. Linear, high-density polyethylene-copolymer is an especially suitable plastic material, although other plastics of the polyolefin or petrochemical family may be employed. An especially preferred plastic is polyethylene having a density ranging between 0.941 and 0.965 gram per cubic centimeter (ASTM test D–1505–63T) and a melt index ranging between 0.1 and 25.0 CASTM test D–1238–62T). Where the latter preferred polyethylene is employed in producing a blow-molded container, the melt index preferably ranges between 0.1 and 0.5, whereas when it is employed in producing an injection-molded container, the melt index preferably lies between 4.0 and 24.0. Of course, as will be obvious to those skilled in the art, the container body and closure member may be constructed or fabricated from various other suitable materials and by a variety of manufacturing processes such as injection molding.

Those skilled in the art will appreciate that a variety of types of barb and groove means may be employed in the subject invention. As best seen in FIGURES 4 and 8, the barb means employed by the preferred embodiment comprise a generally triangular cross-sectional area. For example, the flat bottom surface of the barb members 18 extends in an outward direction from side wall 10 and is inclined downwardly. The top surface of the barbs is also inclined downwardly. A group of alternative exemplary barb and groove means including barb means suitable for use with a tear strip are shown in the patent to Bardell, Patent No. 3,376,996. Any of the barb means shown therein may also be used with the present invention. In addition, removal of the closure member will be facilitated by using breakaway barbs or barbs which are substantially smaller than those illustrated in FIGURES 4 and 8.

In order to use the invention, a container body (including the two-piece container body shown in FIGURES 5, 6, and 8) is filled with any desired liquid and the channel located in a closure member is urged downwardly over the barb means located in the container body. As the closure member descends over the container body, the grooves in the channel successively mate with the barb means until the top rim of the container body is in an abutting relationship with respect to the resilient sealer located in the channel, and the closure member can descend no further. When the closure member is mated with the container body, the rim of the container body depresses the sealer, and the barbs located in the container body mate in positive locking engagement with the grooves in the walls of the channel to form a fluid-tight seal.

A particular advantage of the container of the present invention is that the depending central disc of the closure is disposed downwardly within and is generally perpendicular to the upper portion of the container side wall structure (the sleeve portion) if the two-piece container body is employed. This arrangement produces a stronger, more durable container, one which is particularly resistant to the abuses to which shipping containers are subjected.

It should be noted that flexure of the side walls will not disrupt the seal between the closure member and container body since the barb means located on both the inner and outer surface of the container body will hold the closure member securely even if the side wall structure is severely distorted. The container body shown in FIGURES 5, 6, and 8, is especially effective in this regard since sleeve 66 is made from a rigid material and holds the rim of the container body in a circular configuration even though the side wall of the container is severely distorted.

In order to open a closed composite container, the outer skirt of the closure member is lifted from locking engagement with the corresponding barb members and the entire closure member is easily removed. Since the closure member is made of a resilient plastic, it is not difficult to lift the outer skirt a sufficient distance to free the groove members in the skirt from engagement with corresponding barb members in the side wall structure.

When resealing of the container is desired, the original sealing process is simply repeated by urging the closure member over the side wall structure of the container body in the manner previously described. As the closure member descends over the container body, the grooves and barbs are again urged into an interlocking relationship, and a fluid-tight seal is formed between the top rim of the container body and the resilient sealer. Resealing may obviously be effected without the use of specialized tools or equipment. When the composite container has been resealed in the manner described, the container provides a closure which will not separate even if the container body is severely distorted during shipment and use.

In accordance with the present invention, a novel and unique container-closure combination is provided, a combination which achieves the desired convenience and effectiveness in opening and closing yet which may be economically manufactured. It should be understood that, while the preferred embodiments illustrated herein show barb means on the container body with corresponding grooves in the closure member, the reverse arrangement could also be employed; that is, the barbs could be provided on the interior of the closure member and the corresponding grooves could be molded in the container body.

It should also be understood that various changes, modifications, and variations in the structure and function of the present invention may be effected without departing from the spirit and scope thereof.

I claim:

1. A container comprising in combination:

an open-end container body including a side wall structure and a bottom wall structure formed integrally with the side wall structure at one end of the container body, the other end of the container body being open;

barb means located on both the inner and outer surfaces of the side wall structure of the container body adjacent the open end thereof;

closure means including an inverted channel provided at the periphery thereof, the said inverted channel having downwardly extending sides arranged so that the closure means is positionable over the open end of the container body, with the inverted channel fitting downwardly over the container body side wall structure;

groove means formed in the opposed inner faces of the channel sides, the said groove means being adapted to removably mate with the barb means located on the container body, whereby the barb means are maintained in positive locking engagement with the corresponding groove means in order to effect a tightly locked condition when the closure means is mated to the open end of the container body.

2. A container, as claimed in claim 1, and further comprising:

resilient sealing means positioned inside the inverted channel of the closure means adjacent the vertex thereof, the sealing means being adapted to urge the closure member away from the container body whereby a fluid-tight seal is effected between the closure member and the container body; and retaining means in association with at least one of the opposed faces of the channel sides for retaining the sealing means in the vertex of the inverted channel.

3. A container, as claimed in claim 2, wherein the side wall structure of the container body is generally cylindrical and wherein the resilient sealing means is a generally annular sealer having a diameter substantially the same as the diameter of the side wall structure at the open end thereof.

4. A container, as claimed in claim 3, wherein said retaining means takes the form of a pair of annular beads, one in each of the opposed faces of the channel sides.

5. A container, as claimed in claim 4, wherein the container body and the closure means are fabricated of plastic.

6. A container, as claimed in claim 2, wherein the barb means comprise a plurality of generally horizontal annular barbs integrally molded in both the inner and outer surfaces of the side wall structure of the container body adjacent the open end thereof, and wherein the groove means comprise a like plurality of generally horizontal annular grooves molded in the opposed inner faces of the channel sides, the cross sections of the groove means being substantially similar to the cross sections of the corresponding barbs.

7. A container, as claimed in claim 6, wherein each annular barb is continuous.

8. A container, as claimed in claim 6, wherein each annular barb is discontinuous.

9. A container, as claimed in claim 6, wherein each barb has a generally triangular cross section and has a generally flat lower surface that is inclined downwardly in an outward direction.

10. A container, as claimed in claim 2, wherein the outer side of the inverted channel extends downwardly a greater distance than the inner side thereof.

11. A container, as claimed in claim 1, wherein the closure means comprises a substantially flat central disc portion which extends into the open end of the container body when the closure means is mated therewith at substantially a right angle with the side wall structure thereby serving to impart strength to the upper portion of the container body.

12. A container, as claimed in claim 1, wherein the side wall structure of the container body comprises:

a generally cylindrical, flexible main wall structure formed integrally with the bottom wall structure; and a substantially rigid sleeve in the form of a second annular inverted channel having downwardly extending sides, the said sleeve being positioned downwardly over the upper end of the main wall structure, the said barb means being provided on the inner and outer sides of the said sleeve.

13. A container, as claimed in claim 12, wherein retaining means are provided for securing the sleeve to the main wall structure.

14. A container, as claimed in claim 12, wherein the main wall structure, bottom wall structure, and closure member are fabricated of plastic and wherein the sleeve is fabricated from a rigid plastic.

15. A container, as claimed in claim 13, wherein the main wall structure, bottom wall structure, and closure member are fabricated of plastic and wherein the sleeve is fabricated of metal.

References Cited

UNITED STATES PATENTS

| 2,977,993 | 4/1961 | Scherer | 220—42 X |
| 3,147,857 | 8/1964 | Eckles | 220—60 X |
| 3,189,072 | 6/1965 | Starr | 220—60 X |
| 3,376,996 | 4/1968 | Bardell | 220—24 |

GEORGE E. LOWRANCE, Primary Examiner

U.S. Cl. X.R.

150—5; 220—42, 60